United States Patent [19]

Kretschmer, Jr. et al.

[11] 4,222,051
[45] Sep. 9, 1980

[54] CASCADED DIGITAL CANCELERS

[75] Inventors: Frank F. Kretschmer, Jr., Laurel; Bernard L. Lewis, Oxon Hill, both of Md.

[73] Assignee: The United States of America as represented by the Secretary of the Navy, Washington, D.C.

[21] Appl. No.: 4,516

[22] Filed: Jan. 18, 1979

[51] Int. Cl.³ .............................................. G01S 3/06
[52] U.S. Cl. .............................. 343/100 LE; 455/303
[58] Field of Search ................. 343/100 LE; 325/371; 455/303

[56] References Cited

U.S. PATENT DOCUMENTS

| | | | |
|---|---|---|---|
| 3,938,153 | 2/1976 | Lewis et al. | 343/100 LE |
| 4,086,592 | 4/1978 | Lewis et al. | 343/100 LE |

*Primary Examiner*—Maynard R. Wilbur
*Assistant Examiner*—Richard E. Berger
*Attorney, Agent, or Firm*—R. S. Sciascia; Philip Schneider; Vincent J. Ranucci

[57] ABSTRACT

The invention is a configuration of digital open-loop cancelers, each of which uses a batch window sampling technique, for decorrelating a main input signal from a plurality of auxiliary input signals by using one or more iterations of cancellation. The main signal includes a desirable signal and undesirable interference signals. The auxiliary signals include the undesirable interference signals which are correlated with the interference of the main signal. Samples of the main signal and a first auxiliary signal are fed to a first digital canceler. The canceler batches them, (forms the samples in a group) and measures the correlation between the main signal and auxiliary signal. This measurement, or weight, is applied to each of the samples of the auxiliary signal which were used to establish the weight. The weighted auxiliary samples are subtracted from the main input signal to produce an output residue signal that is uncorrelated with the auxiliary signal. The residue signal is fed to a second canceler which operates in the same manner as the first canceler. A second auxiliary signal is also fed to the second canceler but is delayed by the processing time of the first canceler. The process is sequentially repeated until all the auxiliary signals have been sampled, the total of the repeated processes being an iteration. Further interference may be eliminated from the main signal by subsequent iterations which are performed by using other sets of cancelers that are connected in series with the prior set.

3 Claims, 6 Drawing Figures

CASCADED DIGITAL CANCELERS

BACKGROUND OF THE INVENTION

This invention relates generally to digital open-loop sidelobe cancelers and more particularly to a series-iterative configuration of digital open-loop cancelers which allows more than one iteration for effectively canceling interference from a number of sources.

Generally a signal-processing system is designed to reduce the presence of undesirable signals received by its receiver. An example of apparatus for reducing undesirable signals is a canceler. A digital open-loop canceler as described in the U.S. Pat. No. 4,086,592 to Lewis, et al., is advantageous over an analog closed-loop canceler because the digital open-loop canceler is independent of loop gain and auxiliary signal power. However, a system comprising a number N of cancelers is required to cancel a significant amount of interference from a number N of interference sources. Such a system of N cancelers is an iteration. Typically, more than one iteration is required to cancel most or all interference from a number of sources.

The use of existing digital open-loop cancelers in a series-iterative configuration having more than one iteration, as for example the configuration described in U.S. Pat. No. 3,938,153 to Lewis et al., is inappropriate for canceling interference from a number of sources because existing cancelers use a sliding-window sampling technique for measuring the correlation between the main signal and an auxiliary signal. This measurement, or weight, causes subsequent cancelers in subsequent iterations to introduce uncorrelated interference, known as control-loop noise, which is due to fluctuations of the weight, into the main input signal. The control-loop noise cannot be removed by successive cancellations or iterations. Such a disadvantage limits the performance of a canceling system so that optimum cancellation cannot be achieved.

SUMMARY OF THE INVENTION

The general purpose and object of the present invention is to effectively decorrelate any undesirable signals, which are received from a number N of interference sources, from a main input signal by using one or more iterations of interference cancellation. This and other objects of the present invention are accomplished by a series-iterative system of digital open-loop cancelers and delays. Each canceler uses a batch window sampling technique for obtaining a weight. The cancelers and delays are configured so that the inputs to a first canceler are the main signal and a first of N auxiliary signals. The inputs to subsequent cancelers are the output of the previous canceler and an auxiliary signal which is delayed by the processing time of the previous cancelers. There are N cancelers and N-1 delays, corresponding to N sources of interference, in an iteration. Further iterations using the output of the prior iteration may be effected to achieve a desired degree of interference cancellation.

The novel aspects of the canceler system are the use by each canceler of a batch window sampling technique for measuring the correlation between the main signal and each auxiliary signal, and the series-iterative configuration of cancelers and delays for providing an effective use of one or more iterations of interference cancellation.

The advantages of the present invention are that an optimum weight is obtained which does not introduce uncorrelated interference to the main signal because the weight does not fluctuate on a sample-to-sample basis, and this optimum weight provides improved interference reduction with increasing numbers of iterations.

Other objects and advantages of the invention will become apparent from the following detailed description of the invention when considered in conjunction with the accompanying drawing wherein:

DETAILED DESCRIPTION OF THE INVENTION

Figure 1:
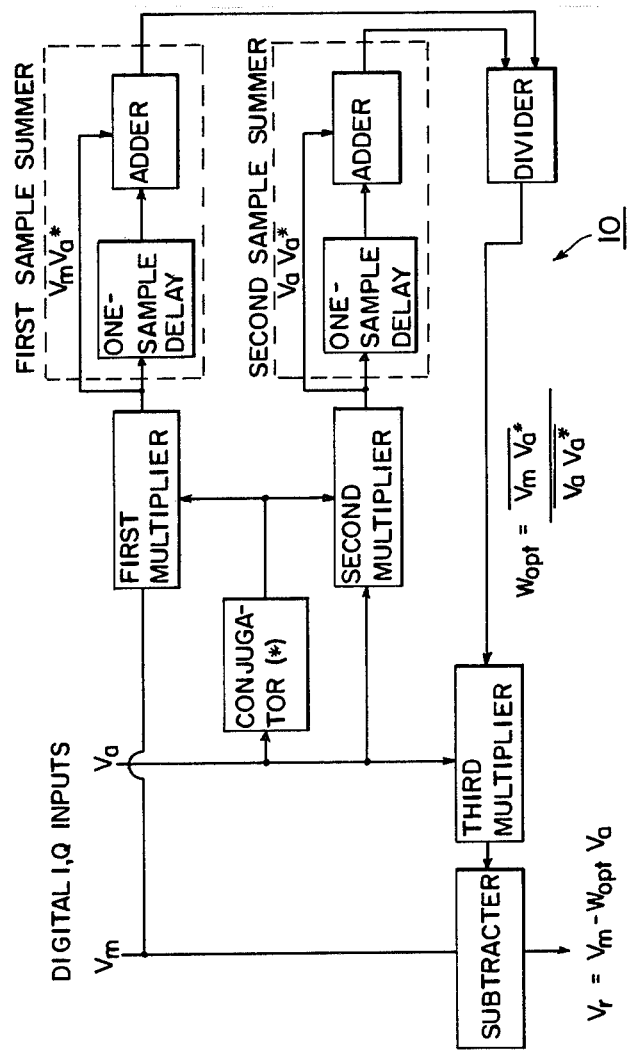
FIG. 1 is a block diagram of a prior-art, digital, open-loop canceler which uses a sliding window sampling technique for establishing a weight which is a measure of correlation between a main input signal and an auxiliary input signal.

A digital, open-loop, sidelobe canceler 10 as disclosed in U.S. Pat. No. 4,086,592, hereby incorporated by reference, is shown in FIG. 1. This canceler is defined by the equation $$V_r = V_m - \left( \frac{\overline{V_m V_a^*}}{\overline{V_a V_a^*}} \right) V_a \tag{1}$$

where $V_r$ is a residue complex output signal (a vector);

$V_m$ is a vector and is a time-varying, complex, main input signal from a main radar directional antenna, and includes interference signals from a number of sources;

$V_a$ is a vector and is a time-varying, complex, auxiliary signal obtained from an auxiliary omnidirectional antenna, and includes interference signals which are correlated with the interference of $V_m$;

$$\frac{\overline{V_m V_a^*}}{\overline{V_a V_a^*}}$$

is a measure of the correlation between $V_m$ and $V_a$ and is a complex weight W (a vector) derived by the processing loop of the canceler for minimzing any interference associated with $V_r$;

$V_a^*$ is the conjugate of $V_a$; and the overbar denotes the product averaged over a number of sampled signals. FIG. 1 shows the mechanization for averaging over two samples; however the canceler 10 may be generalized for averaging over more samples by the addition of more delays within each sample summer. The canceler 10 computes $$W = \frac{\overline{V_m V_a^*}}{\overline{V_a V_a^*}}$$

by the sliding window technique. This technique averages $\overline{V_m V_a^*}$ and $\overline{V_a V_a^*}$ over a group of n samples, the number n being determined by the number of delays in the sample summer. The technique recomputes $\overline{V_m V_a^*}$ and $\overline{V_a V_a^*}$, and therefore the weight W, for each new sample, $V_m(i)$ and $V_a(i)$, added to the group. The recomputed weight $W_i$ is then applied to the most recent sample $V_a(i)$, which was used to recompute $W_i$, for obtaining the residue output $V_r(i)$. Each time the most recent sample is added to the group of n averaging samples, the oldest sample is removed from the group. Thus, the window which looks at the group of n averaging samples slides along while constantly adding the newest sample and deleting the oldest sample from the group. The residue output signal $V_r(i)$ is thereby formed according to the formula:

$$V_r(i) = V_m(i) - W_i V_a(i). \quad (2)$$

Figure 2:
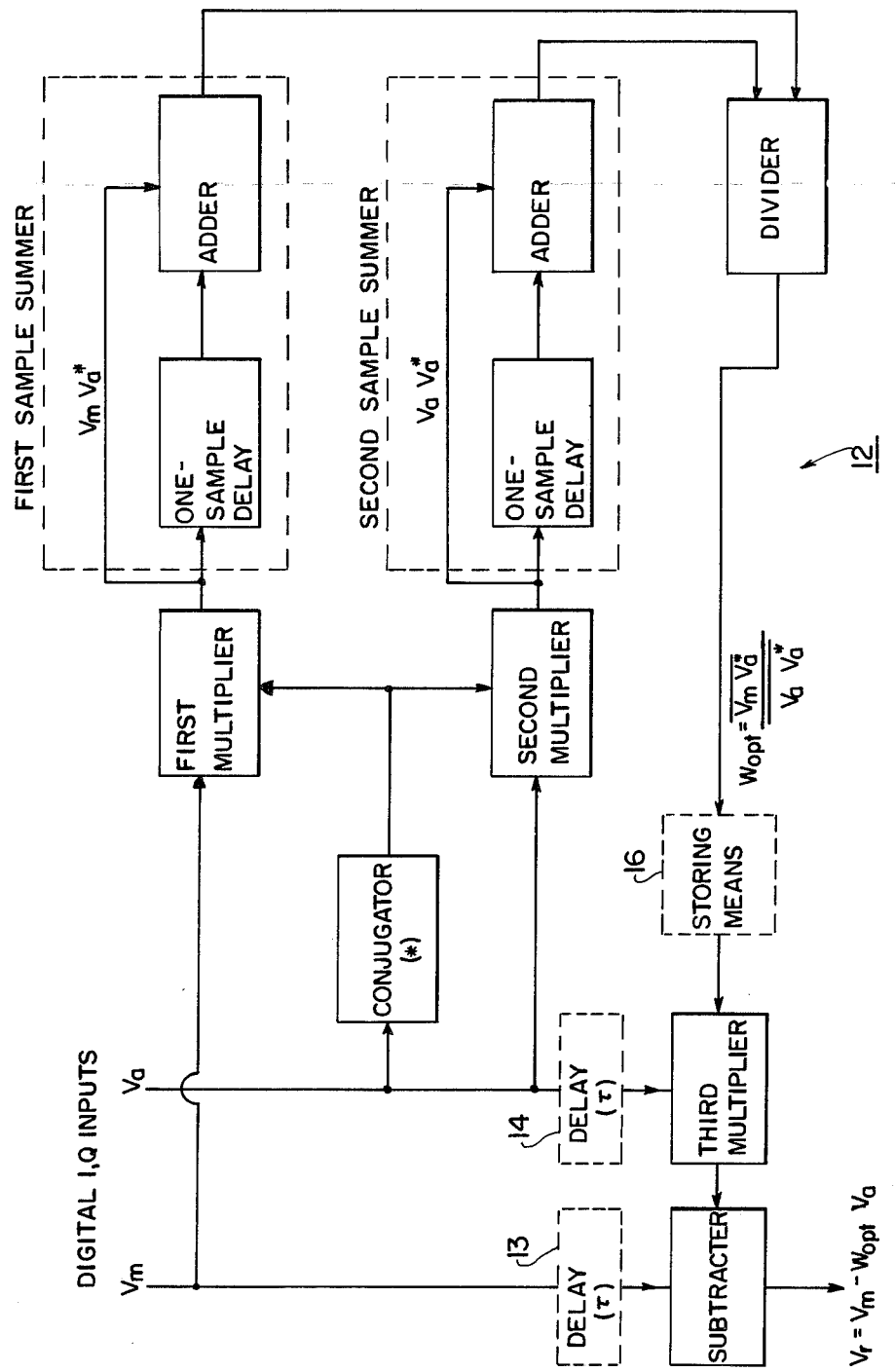
FIG. 2 is a block diagram of a digital open-loop canceler which uses a batch window sampling technique for establishing the weight.

FIG. 2 shows the canceler of FIG. 1 in a modified form 12 which enables the canceler to establish the weight W by using a batch window technique rather than the sliding window method. The batch window technique allows the digital, open-loop canceler 12 to be effectively cascaded to achieve an optimum weight. In lower bandwidth operations, a single digital canceler may achieve the optimum weight by means of a multiplexing operation, as will be more fully explained hereinafter.

The modification of the canceler 12 includes delays 13 and 14 for delaying $V_m$ and $V_a$, and a storing means 16, such as a central register, for storing the weight W. The canceler 12 may be referred to hereinafter as a digital open-loop batch-window-sampling-technique sidelobe canceler.

The canceler 12 using the batch window technique establishes W from an input of n samples in a batch according to $$W = \frac{\sum_{i=1}^{n} V_m(i) V_a^*(i)}{\sum_{i=1}^{n} V_a(i) V_a^*(i)} \quad (3)$$

The samples $V_m(i)$ and $V_a(i)$ are each delayed by $\tau$ as shown in FIG. 2, where $\tau$ corresponds to the time span of the n samples plus the processing time of the canceler 12. The developed weight, W, is held by the storing means 16 and then applied to each of the n samles of $V_a(i)$ which were used to establish W. The ith residue signal is then given by $$V_r(i) = V_m(i) - W V_a(i). \quad (4)$$

Therefore, rather than update the weight for each new sample $V_m(i)$ and $V_a(i)$ and then apply the newly established weight $W_i$ to the new sample $V_a(i)$ which was used to establish that weight as in the sliding window technique, the batch window method establishes a weight W for each batch having a number of samples $V_m(i)$ and $V_a(i)$, delays each of those samples until the weight is developed, and then applies that weight to each of the signals $V_a(i)$ used to establish that weight.

Figure 3:
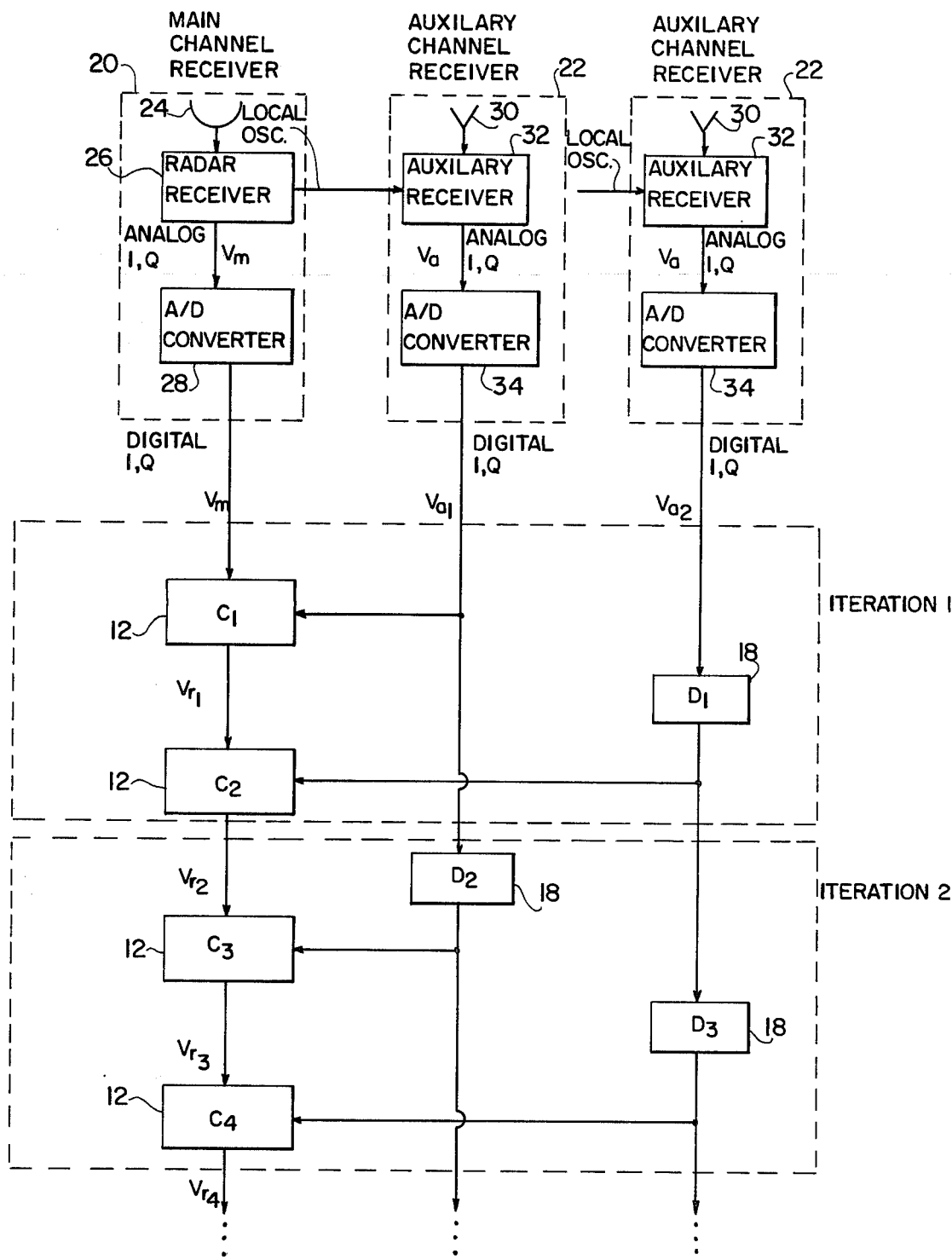
FIG. 3 is a block diagram of the invention showing the digital cancelers of FIG. 2 in a cascaded configuration for decorrelating a main signal from a number of auxiliary signals.

FIG. 3 shows a cascaded series-iterative configuration of digital cancelers 12 shown in FIG. 2 and delays 18 which comprises the present invention. Two iterations are shown for illustrative purposes but any number of iterations may be used depending on the degree of interference cancellation which is desired. The signals which are supplied to the configuration are from a conventional main-channel receiver 20 and a number, two, in this case, for illustrative purposes, of conventional auxiliary-channel receivers 22. A canceler system requires N auxiliary channel receivers and typically N digital open-loop cancelers per iteration to cancel interference or jamming from N jammers. Therefore, the system shown in FIG. 3 will cancel jamming from only two jamming sources.

The main channel receiver 20 including main radar antenna 24, radar receiver 26, and A/D converter 28, is used to receive radar echo signals from a target and any interference or jamming that may be present. An output signal $V_m$ having digital I and Q components is produced. Main radar antenna 24 is directional and receives a complex signal having a radar component and an interference component. An output is provided to radar receiver 26 which produces a video output signal separated into analog I and Q components. This signal is fed to A/D converter 28 for conversion to digital I and Q components which comprise signal $V_m$.

Auxiliary channel receivers 22, including auxiliary antennas 30, auxiliary receivers 32, and A/D converters 34, receive interference or jamming signals and produce outputs $V_a^1$ and $V_a^2$ having digital I and Q components. Auxiliary antennas 30 are omnidirectional antennas having a gain greater than the largest sidelobe of main radar antenna 24. Auxiliary receivers 32 and A/D converters 34 operate to produce the signals $V_a^1$ and $V_a^2$ which have digital I and Q components.

The digital complex signals $V_m$ and $V_a^1$ are inputs to canceler $C_1$ which establishes a weight using the batch window method and forms an output residue signal $V_r^1$ from a batch of n samples in the manner discussed previously and shown in FIG. 2. $V_r^1$ becomes the main input to canceler $C_2$. The auxiliary signal input to $C_2$ is $V_a^2$ which is delayed by $D_1$ to allow for the processing time associated with $C_1$. Canceller $C_2$ then computes its weight, using $V_r^1$ and $V_a^2$ as inputs, in the same manner as $C_1$ and uses this weight to determine the output residue signal $V_r^2$. The first iteration is thereby completed. Each weight computation is of the form given by equation (3) which causes the residue signal to have a minimum mean square value computed over the window or batch size, that is, the group of n samples. The weight thus established is optimum in the sense of reducing the average power of the interference associated with the residue signal over the batch size.

The process is repeated as indicated in FIG. 3 where the auxiliary signals $V_a^1$ and $V_a^2$ are delayed by $D_2$ and $D_3$ respectively and used with cancelers $C_3$ and $C_4$, respectively, in the second iteration. More iterations may be utilized. In effect, the weights determined by cancelers $C_1$, $C_3$, $C_5$ . . . , using $V_a^1$ as the auxiliary signal, which weights are denoted by $W_1$, $W_3$, $W_5$ . . . form a convergent series which may be written as $W_a^1 = \Sigma W_i$, i = 1, 3, 5, . . . . Similarly, the weights associated with cancelers $C_2$, $C_4$, $C_6$ . . . , using $V_a^2$ as the auxiliary signal, may be written as $$W_a^2 = \Sigma W_i, \ i = 2, 4, 6 \ldots$$

The residue output signal $V_r$ may then be written as $$V_r = V_m - W_a^1 V_a^1 - W_a^2 V_a^2$$

where $W_a^1$ and $W_a^2$ converge to the optimum weight values.

Figure 4:
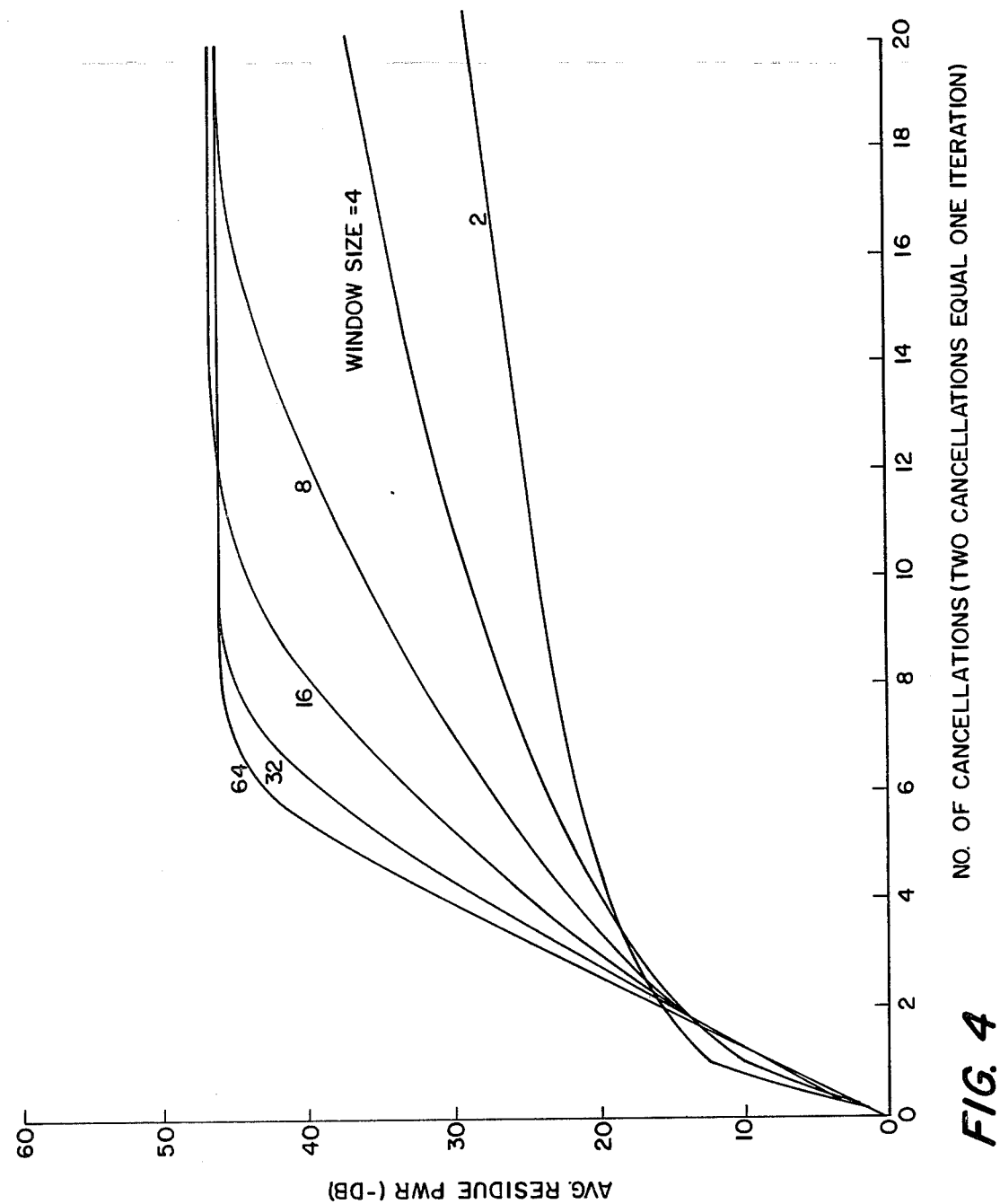
FIG. 4 is a graph illustrating the amount of interference in a main signal which is decorrelated from auxiliary signals by the batch window technique.

FIG. 4 shows the results of interference cancellation for the situation presented in FIG. 3. The total interference level in the main signal $V_m$ is at 0 dB in FIG. 4. The thermal noise component of the main signal, that is, the signal with no interference, is about 50 dB below the interference level. FIG. 4 shows the values of the residue signal at the output of each canceler for different batch-processing window sizes, that is, a window size equals the number of samples used to form the weight W for a canceler as discussed previously. The optimum weighting provides a residue signal of approximately $-46.5$ dB. As more samples are included in the batch window, fewer cancellation iterations, and thus fewer cancelers, are required.

Figure 5:
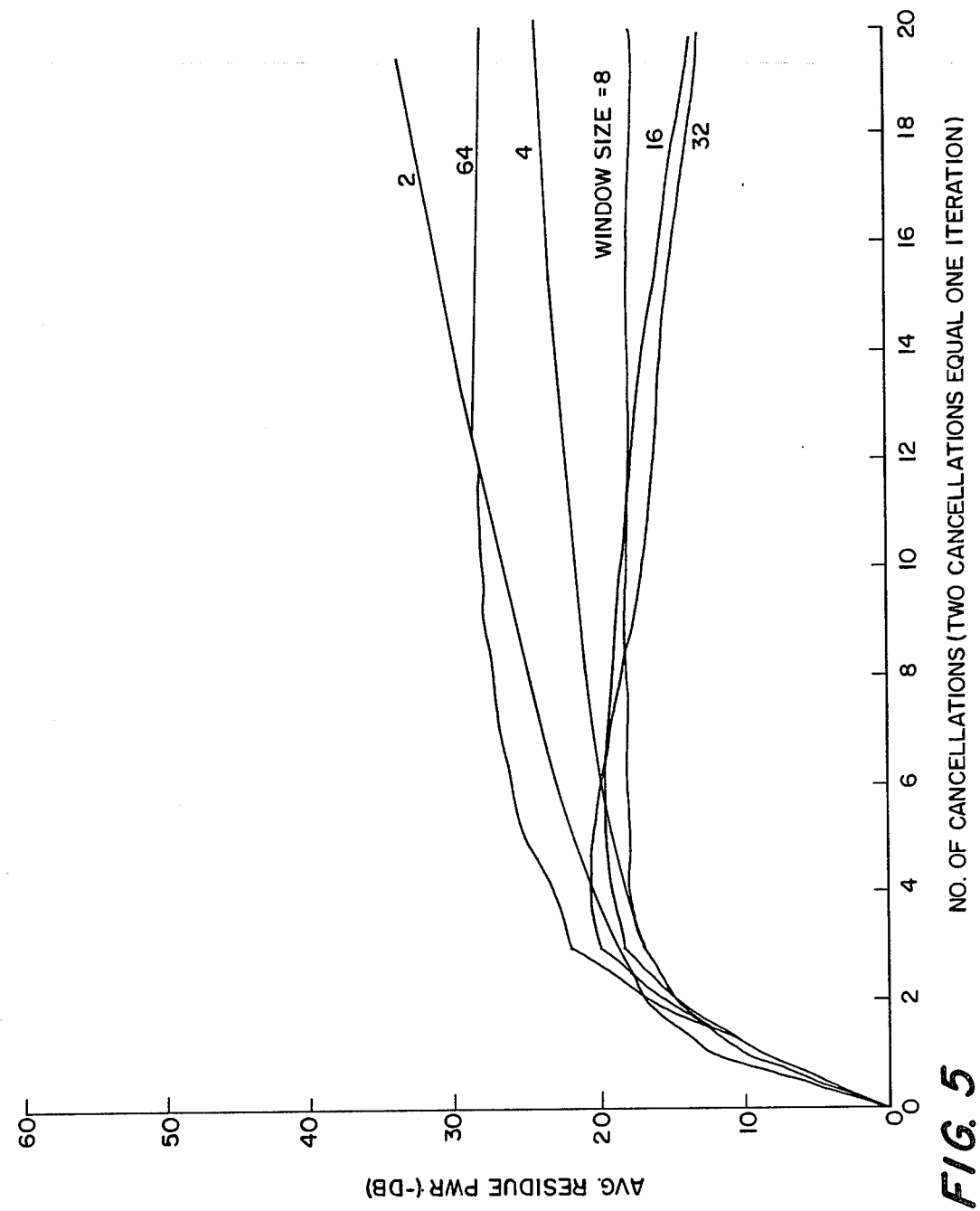
FIG. 5 is a graph corresponding to FIG. 4 and illustrating the results of the sliding window technique.

FIG. 5 shows the results of unsatisfactory interference cancellation which is obtained by using the sliding window technique of the canceler shown in FIG. 1 for the situation corresponding to that of FIG. 4.

Figure 6:
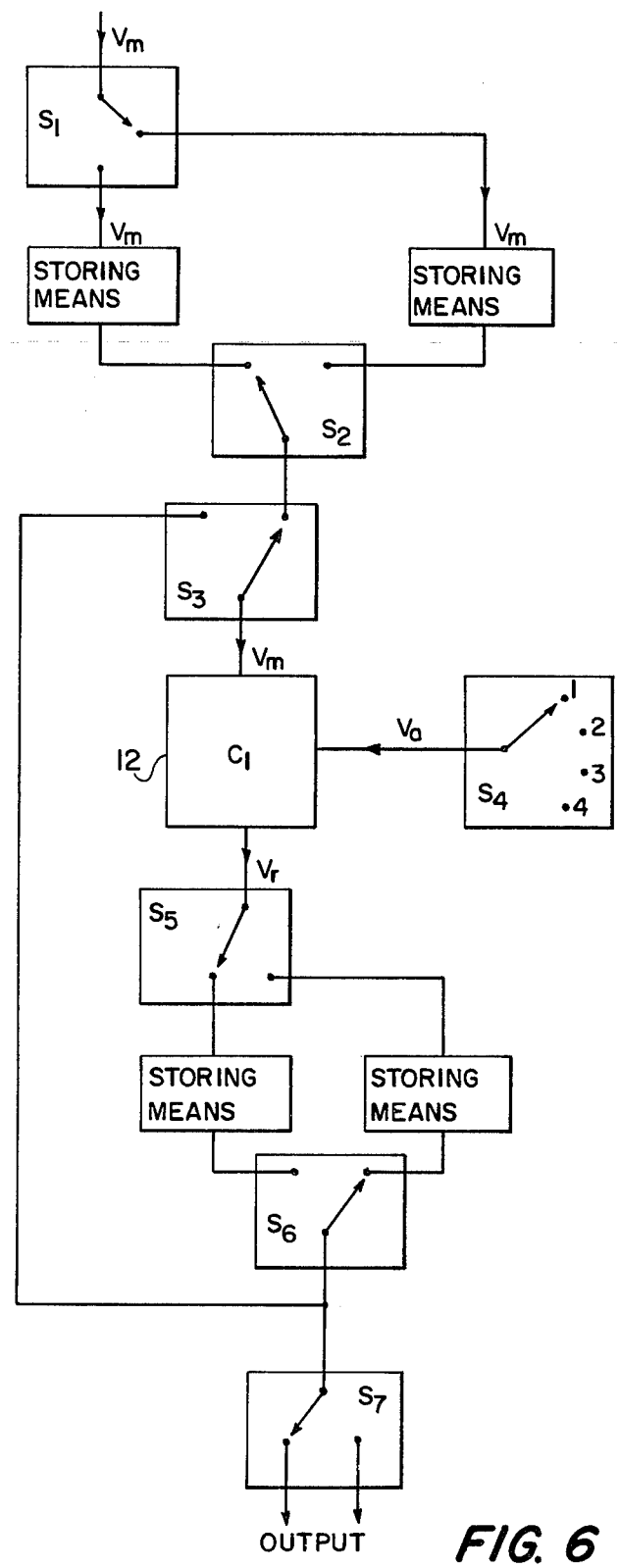
FIG. 6 is a block diagram showing the canceler of FIG. 3 in a multiplexed configuration.

Since each canceler performs the same operation in computing the weights, the operation depicted in FIG. 3 for the various cancelers may be accomplished by a single canceler which is sequentially multiplexed, as for example, with switches $S_1$–$S_7$ and storing means shown in FIG. 6 for multiplexing the four-canceler operation of FIG. 3, in narrow-bandwidth operations where the batch duration is longer than the total processing time of the series-iterative canceler system. The batch duration is the product of the number of samples in a batch and the sampling interval.

Obviously many more modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A system for canceling interference from a plurality of interference sources, said system receiving a digital complex main input signal from a main channel and a plurality of digital complex auxiliary input signals from a plurality of auxiliary channels, which main and auxiliary signals may have correlated interference signal components, comprising:

first iteration means coupled to said main channel and said auxiliary channels, having a plurality of digital open-loop batch-window-sampling-technique sidelobe cancelers and having delaying means, with a different canceler being coupled to each auxiliary signal channel such that each canceler has an input from the main channel signal and its associated auxiliary channel signal, and each canceler providing a residue main signal output having reduced interference, said cancelers being sequentially connected in a series in such manner that the main channel signal input to the first canceler of said series is the output from a main channel receiver, the main channel signal input to succeeding cancelers of said series being the residue output signal from a preceding canceler of said series, said auxiliary channel signal input to a canceler being delayed by said delaying means for the processing time of all preceding cancelers, each canceler receiving said main channel signal input and said auxiliary channel signal input for forming a batch of samples of the main signal and the auxiliary signal, establishing a weight corresponding to the degree of correlation between the main signal and the auxiliary signal, delaying said samples until said weight is established, storing said weight for applying the weight to each of said samples of said auxiliary signal which is in said batch, and subtracting said weighted samples from said samples of the main signal for producing said residue output signal having reduced interference.

2. The system of claim 1 wherein at least one additional iteration means is coupled to said first iteration means and functions in the same manner as said first iteration means except that the main channel input to the first canceler in the series of cancelers of said additional iteration means is the residue output signal from the last of the series of cancelers in the preceding iteration means.

3. The system of claim 2 wherein at least one of said cancelers is multiplexed for receiving said main channel input signal and said plurality of auxiliary channel input signals for reducing the interference in the main channel signal.

* * * * *